United States Patent
Ma et al.

(10) Patent No.: US 11,032,150 B2
(45) Date of Patent: Jun. 8, 2021

(54) AUTOMATIC PREDICTION OF BEHAVIOR AND TOPOLOGY OF A NETWORK USING LIMITED INFORMATION

(71) Applicant: INTERNATIONAL BUSINESS MACHINES CORPORATION, Armonk, NY (US)

(72) Inventors: Liang Ma, White Plains, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 16/443,121

(22) Filed: Jun. 17, 2019

(65) Prior Publication Data

US 2020/0396135 A1 Dec. 17, 2020

(51) Int. Cl.
| | | |
|---|---|---|
| *H04L 12/24* | (2006.01) | |
| *G06N 3/04* | (2006.01) | |
| *H04L 12/721* | (2013.01) | |
| *G06N 20/00* | (2019.01) | |
| *H04L 12/751* | (2013.01) | |

(52) U.S. Cl.
CPC ............ *H04L 41/145* (2013.01); *G06N 3/04* (2013.01); *G06N 20/00* (2019.01); *H04L 41/12* (2013.01); *H04L 45/02* (2013.01); *H04L 45/70* (2013.01)

(58) Field of Classification Search
CPC .......... G06N 20/00; G06N 7/005; G06N 5/04; G06N 5/022; G06N 5/025; G06N 3/04; H04L 41/147; H04L 51/02; H04L 51/04; H04L 51/14; H04L 51/30; H04L 67/10; H04L 41/145; H04L 41/12; H04L 45/02; H04L 45/70
See application file for complete search history.

(56) References Cited

U.S. PATENT DOCUMENTS

| | | | |
|---|---|---|---|
| 7,408,885 | B2 | 8/2008 | Denby et al. |
| 8,660,018 | B2 | 2/2014 | Sharma et al. |
| 8,811,395 | B2 | 8/2014 | Gerber et al. |
| 9,838,260 | B1 | 12/2017 | McClintock et al. |
| 10,277,476 | B2* | 4/2019 | Mermoud ............... H04L 41/12 |
| 10,366,451 | B2* | 7/2019 | Kaznady .................. G06N 3/02 |
| 2007/0253341 | A1* | 11/2007 | Atkinson ............... H04L 45/02 370/252 |
| 2012/0296701 | A1* | 11/2012 | Breiter ............... G06Q 30/0203 705/7.33 |

(Continued)

FOREIGN PATENT DOCUMENTS

WO 2016159968 10/2016

*Primary Examiner* — Ninos Donabed
(74) *Attorney, Agent, or Firm* — F. Chau & Associates, LLC

(57) ABSTRACT

The present disclosure provides a method for automatically predicting a topology of a network comprising a plurality of nodes. The method includes: selecting a path performance metric among a plurality of available metrics; obtaining path performance metrics of selected node pairs among the plurality of nodes; using the obtained path performance metrics to train a machine-learning model to predict the path performance metric for the remaining node pairs; and using the obtained and predicted path performance metrics to construct a topology of the network.

13 Claims, 5 Drawing Sheets

(56) References Cited

U.S. PATENT DOCUMENTS

| | | | |
|---|---|---|---|
| 2015/0195149 A1* | 7/2015 | Vasseur | H04L 41/5019 |
| | | | 370/252 |
| 2016/0028608 A1* | 1/2016 | Dasgupta | H04L 43/16 |
| | | | 370/252 |
| 2016/0359686 A1 | 12/2016 | Parandehgheibi et al. | |
| 2017/0213280 A1* | 7/2017 | Kaznady | G06N 20/20 |
| 2017/0317890 A1 | 11/2017 | Puleri et al. | |
| 2018/0046918 A1* | 2/2018 | Moon | G06N 3/08 |
| 2018/0309636 A1* | 10/2018 | Strom | H04L 41/0813 |
| 2018/0359172 A1* | 12/2018 | Yadav | H04L 45/70 |
| 2019/0044535 A1* | 2/2019 | Ahmad | G06N 3/04 |
| 2019/0130560 A1* | 5/2019 | Horowitz | B25J 9/0093 |
| 2019/0166141 A1* | 5/2019 | Xu | G06N 20/00 |
| 2019/0228037 A1* | 7/2019 | Nicol | G06N 3/084 |
| 2019/0228340 A1* | 7/2019 | Nicol | G06N 3/105 |
| 2019/0279038 A1* | 9/2019 | Nicol | G06F 16/9024 |
| 2019/0279086 A1* | 9/2019 | Nicol | G06N 3/08 |
| 2019/0286153 A1* | 9/2019 | Rankawat | G06T 7/11 |
| 2019/0312810 A1* | 10/2019 | Strom | H04L 45/48 |
| 2019/0325309 A1* | 10/2019 | Flamant | G06F 16/9024 |
| 2020/0007934 A1* | 1/2020 | Ortiz | H04N 21/25883 |

\* cited by examiner

```
input  : Path performance measurements for each node pair
         in S: {(φ, d_φ)}_{φ∈S}, proportion of additional data α
         (0 < α < 1), update weight β (0 ≤ β < 1)
1 Output : Inferred path performance metric for each node pair
           in T \ S 2 foreach node pair μ in T \ S do
     d̃μ ← path performance estimation for μ using the input
           measurement data {(φ,d_φ)}_{φ∈S};
3 end
4 while the maximum number of iterations is not reached do
5      randomly choose α|T S| node pairs from T \ S to form
       the augmented node pair set A;
6      training_data = {(φ,d_φ)}_{φ∈S} ∪ {(θ, d̃_θ)}_{θ∈A};
7      use the above training_data to train NeuTomography;
8      foreach μ ∈ T \ S do
9         d̃μ ← β · d̃μ + (1−β · NN(μ);    // NN(μ) is the
          path performance metric for the input node
          pair μ predicted by NeuTomography
10     end
11 end
```

FIG. 3

AUTOMATIC PREDICTION OF BEHAVIOR AND TOPOLOGY OF A NETWORK USING LIMITED INFORMATION

BACKGROUND

1. Technical Field

This disclosure relates to techniques for automatically predicting behavior and topology of a network, and more particularly to using machine learning to automatically predict behavior and topology of a network using limited information.

2. Discussion of Related Art

Network tomography, a classic research problem in the realm of network monitoring, refers to the methodology of inferring unmeasured network attributes using selected end-to-end path measurements. In the research community, network tomography is generally investigated under the assumptions of known network topology, correlated path measurements, bounded number of faulty nodes/links, or even special network protocol support. The applicability of network tomography is considerably constrained by these strong assumptions, which therefore frequently position it in the theoretical world.

Accurate and timely knowledge of network states (e.g., delays and congestion levels on individual paths) is essential for various network operations such as route selection, resource allocation, fault diagnosis, and service migrations. Directly measuring the path quality with respect to each individual node pair, however, is costly and not always feasible due to the large traffic overhead in the measurement process and the lack of protocol support at internal network elements for making such measurements. Therefore, such limitations motivate the need for indirect approaches.

Depending on the granularity of observations, indirect approaches can be classified as hop-by-hop or end-to-end approaches. The former rely on special diagnostic tools such as traceroute, pathchar, a network characterization service (NCS), or time series latency probes (TSLP) to reveal fine-grained performance metrics of individual links by sending active probes. Specifically, traceroute reports delay for each hop on the probed path by gradually increasing the time-to-live (TTL) field of probing packets. Its refinement, pathchar, returns hop-by-hop delays and loss rates. Later advancements, NCS and TSLP, return capacities on each link. While the above-described tools provide fine-grained information, they also require that Internet Control Message Protocol (ICMP) be supported at each internal node. Even then, they suffer from inaccuracies caused by asymmetry in routes and different priorities of ICMP and data packets. Moreover, these tools generate a large number of probing packets, causing extra load and, potentially, congestion. In risk-sensitive applications, security policies may even block hop-by-hop measurements.

Existing work on network tomography emphasizes extracting as much network information as possible from available measurements. However, past experience shows that network tomography mostly exists in the theoretical level under strong assumptions, and is thus difficult to apply to real network monitoring tasks. For example, prior works almost always require the precise knowledge of the network topology and even assume that the network topology follows a tree structure. Unfortunately, in real applications, network topologies are frequently concealed from others for security reasons.

Thus, there are several technical problems with regard to conventional systems that measure network performance using indirect approaches.

BRIEF SUMMARY

Embodiments of the present disclosure solve the foregoing problems in the art with systems, non-transitory computer-readable media, and methods for automatically predicting topology of a network. An exemplary embodiment of the inventive concept provides a generic and light weight tomography framework that is applicable to almost every practical network setting. The input to this tomography framework is only a set of end-to-end path measurements with respect to some node pairs, and the output is the predicted path performance metrics for all unmeasured node pairs. For each input datapoint, the only available information is the starting/terminating nodes and their corresponding path performance metric. The proposed tomography framework is based on a deep neural network model, which learns the non-linear relationship between node pairs and their path performance metrics.

At least one exemplary embodiment of the present disclosure provides a computer-implemented method for automatically predicting topology of a network comprising a plurality of nodes. The method includes: selecting, by a processor, a path performance metric among a plurality of available metrics; obtaining, by the processor, path performance metrics of selected node pairs among the plurality of nodes; using, by the processor, the obtained path performance metrics to train a machine-learning model to predict the path performance metric for the remaining node pairs; and using, by the processor, the obtained and predicted path performance metrics to construct a topology of the network.

At least one exemplary embodiment of the present disclosure provides a system for automatically predicting topology of a network comprising a plurality of nodes. The system includes a memory storing a computer program and a processor configured to execute the computer program. The computer program selects a path performance metric among a plurality of available metrics, obtains path performance metrics of selected node pairs among the plurality of nodes, uses the obtained path performance metrics to train a machine-learning model to predict the path performance metric for the remaining node pairs, and uses the obtained and predicted path performance metrics to construct a topology of the network.

At least one exemplary embodiment of the present disclosure provides a computer program product for automatically predicting a topology of a network comprising a plurality of nodes. The computer program product includes a computer readable storage medium having program code embodied therewith. The program code is executable by a processor to perform method steps including instructions for: selecting a path performance metric among a plurality of available metrics; obtaining path performance metrics of selected node pairs among the plurality of nodes; using the obtained path performance metrics to train a machine-learning model to predict the path performance metric for the remaining node pairs; and using the obtained and predicted path performance metrics to construct a topology of the network.

Additional features and advantages of the above embodiments and additional embodiments of the present disclosure are outlined in the description which follows, and in part will be obvious from the description, or may be learned by the practice of such example embodiments.

BRIEF DESCRIPTION OF THE DRAWINGS

The detailed description describes one or more embodiments with additionally specificity and detail through use of the accompanying drawings, briefly described below.

FIG. 3 illustrates an algorithm for determining a network topography according to an exemplary embodiment of the inventive concept.

DETAILED DESCRIPTION OF THE EXEMPLARY EMBODIMENTS

One or more embodiments of the present disclosure include a system (e.g., tomography framework) that can more accurately predict a network tomography given only the end-to-end path performance metrics of sampled node pairs. For example, the system utilizes deep neural network and data augmentation to predict the unmeasured performance metrics via learning non-linear relationships between node pairs and underlying unknown topological/routing properties. In addition, the system can be employed to reconstruct the original network topology, which is important to most network planning decisions.

Compared to existing tomography solutions, the proposed network tomography framework is generic and easily applicable in that it does not require additional network knowledge or rely on a specific performance metric type (for example, additive or non-additive). Moreover, since the given measured node pairs potentially can be any subset of all node pairs in the network (i.e., there may exist measurement bias), in an preferred embodiment, the tomography framework constructs additional input data by estimating the performance bounds of unmeasured node pairs using the given path measurements. Without considering the additional input data measuring, measuring only 30% of the node pairs, the proposed framework is able to accurately predict the path performance of the remaining 70% of the node pairs, with a mean absolute percentage error (MAPE) as small as 2%. However, when the additional input data is considered, the proposed framework may further reduce MAPE by up to 50%. Further, even though the proposed framework is not given any information about the network topology, the proposed framework provides a solution to reconstruct the network topology with different granularities utilizing only the given end-to-end node pair measurements. The constructed network topology is of high accuracy, thus revealing more insights to network operators for resource optimizations.

Figure 1:
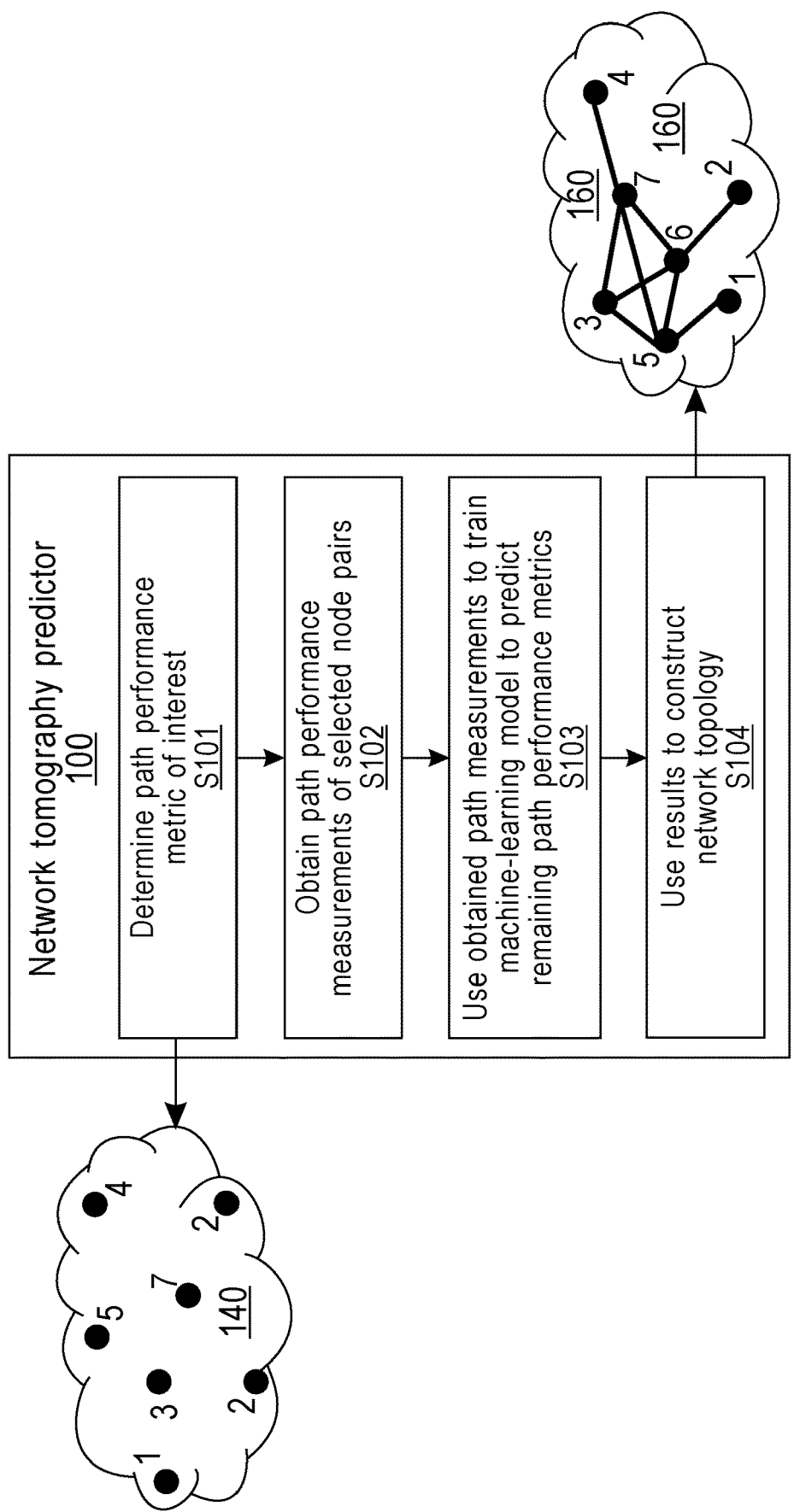
FIG. 1 is a block diagram illustrating a method of determining a network topography according to an exemplary embodiment of the inventive concept.

FIG. 1 illustrates the architecture of a predictor for automatically predicting a network tomography according to an exemplary embodiment of the inventive concept. The predictor 100 may be implemented as a computer program. The predictor 100 operates on input network data 140 to generate an output network tomography 160. In an exemplary embodiment, the input network data 140 includes identifying information identifying all the nodes in a network. The identifying information may indicate node names of all the nodes and internet protocol (IP) addresses of each of the nodes. In the example shown in FIG. 1, node names of "1", "2", "3", "4", "5", "6", and "7" are present. While seven nodes are illustrated in FIG. 1, the inventive concept is not limited to any particular number of nodes. The input network data 140 also includes path performance metrics of a subset (e.g., 20%, 25%, 30%, ⅓ etc.) of the total available node pairs. For example, since $_7C_2=21$, there are 21 possible node pairs, and a ⅓ subset would be 7 node pairs. Thus, the path performance metrics to create a ⅓ subset would include a path performance metric for the 7 paths. For example, the 7 paths could be the path between node 1 and node 4, the path between node 2 and node 7, the path between node 1 and node 3, the path between node 2 and node 6, the path between node 5 and node 6, the path between node 1 and node 2, and the path between node 2 and node 3. A path performance metric along a path between nodes of a node pair may be an additive performance metric or a non-additive performance metric.

The path performance metric is additive if the combined metric over a path is the sum of all involved individual link metrics. For instance, path length (e.g., number of hops on a path) and path delay are directly additive, and some statistical attributes such as path jitter are additive. Path jitter is the combination of individual link jitters if all link latencies are mutually independent. A multiplicative path metric such as packet delivery ratio is also an additive performance metric. A multiplicative path metric can be expressed in an additive form of individual link metrics by using a log function.

A path performance metric is non-additive if the path metric is not the sum of all involved link metrics. For instance, a binary path status (normal or failed) is considered a non-additive metric. For example, the end-to-end path is normal if all involved links are normal, and abnormal if there is exists one failed link on the path. Further, metrics such as a path congestion level and a bandwidth are considered non-additive since they are determined by the most problematic link among all links on the path.

The predictor 100 determines the path performance metric of interest (S101). For ease of discussion, it is assumed that the predictor 100 has selected an additive path-performance metric such as path delay as the path performance metric of interest. However, the inventive concept is not limited thereto. For example, a different additive path performance metric could have been selected or a non-additive path performance metric could have been selected.

Once the path performance metric has been determined, the predictor 100 obtains path performance measurements of selected node pairs (S102). For example, rather than obtain the path performance measurements of all node pairs, performance measurements are only obtained for a small subset (e.g., 30%) of the available node pairs. Using the above example and a metric of path delay (e.g., a certain number of milliseconds, seconds, etc.) would obtain a first path delay between node 1 and node 4, a second path delay between node 2 and node 7, a third path delay between node 1 and node 3, a fourth path delay between node 2 and node 6, a fifth path delay between node 5 and node 6, a sixth path delay between node 1 and node 2, and a seventh path delay path between node 2 and node 3. As an example, the predictor 100 could use an operating system command such as ping, traceroute, or tracert to obtain these path performance measurements. For example, the predictor 100 could send a command to a given node of a node pair being measured to request that the given node ping the other node (i.e., send a message). The results of the ping indicate how long (i.e., a time) it took to receive a response from the other node. This time can then be returned to the predictor 100, where a network delay can be determined from the time. As another example, these path performance measurements could have been previously obtained by another actor and stored in memory (e.g., see 30 in FIG. 5) in a table, file, or database accessible by the predictor 100.

The predictor 100 then uses the obtained path performance measurements to train a machine-learning model (e.g., a neural network) to predict the remaining path performance metrics (S103). For example, the machine-learning model could be used to predict the delay between the remaining node pairs such as nodes 2 and 4, nodes 2 and 5, nodes 3 and 7, etc.

The predictor 100 then uses the results (e.g., the obtained and predicted path performance metrics) to construct a network topology network tomography 160 (S104). In an exemplary embodiment, the path performance metric of each node pair is compared to a corresponding predefined range to determine whether there is a direct link between nodes of the pair. For example, if the path performance metric is within the range, then there is a direct link between the nodes of the pair and if the path performance metric is outside the range, then there is no direct link between nodes of the pair. In another exemplary embodiment, the path performance metric of each node pair is compared to a corresponding predefined threshold to determine whether there is a direct link between nodes of the pair. For example, when the path delay between two nodes is small, it is likely that there is a direct link between these nodes and when the path delay is large, is likely that there is no direct link between these nodes. For example, if the path delay is smaller than a certain threshold, it can be assumed that there is a direct link, and if the path delay is larger or equal to the threshold, it can be assumed there no link is presented. The obtained path performance metrics, the predicted path performance metrics, and the predicted network topology constitute the output network tomography 160. For example, in the network tomography 160 illustrated in FIG. 1, it was determined that there is a direct link between node 5 and 6, but no direct link between nodes 1 and 2.

The predictor 100 initially only knows the performance metric of the end-to-end paths between only some of the node pairs. Prior to step S104, the predictor 100 has no knowledge on which other nodes are each of the end-to-end paths. For example, the predictor 100 does not initially know that the end-to-end path between node 5 and node 4 includes node 7. Further, prior to step S104, the predictor 100 does not know the network topology or even the number of links in the network.

For a network G with n nodes, there are $$\binom{n}{2}$$

node pairs. V denotes the set of nodes in G (|V|=n) and set $\{v_i, v_j\}$ ($v_i, v_j \in V$, vi≠vj) a node pair. The selected node pairs may referred to as a set S, and the total available node pairs may be referred to as set T. Though set S can be any subset of set T, set S ideally cover all nodes in the network. If c denotes a path performance metric vector of all node pairs in set S, then the network tomography problem can be described by equation 1 as follows:

$$R \otimes w = c, \quad (1)$$

where w is the performance metric vector of all links in the network with entry $w_i$ denoting the performance metric of link $I_i$, $R=(R_{i,j})$ is called the routing matrix with each entry $R_{i,j} \in (0, 1)$ representing whether link $I_j$ is present on the path between the i-th node pair in S, and $\otimes$ is the operator indicating how link metrics are related to the end-to-end path metrics. At least embodiment of the invention attempts to infer the routing matrix R' corresponding to the unmeasured node pairs in T\S. The inferred path performance metrics for T\S are computed via $R' \otimes w$. Since an ultimate goal is to determine $R' \otimes w$ rather than R' and w, the binary values in the routing matrices R and R' can be relaxed to continuous values ranging from 0 to 1, thus forming stochastic routing matrices, denoted by $\tilde{R}$ and $\tilde{R}'$, respectively. Then entry $\tilde{R}i, j$ in $\tilde{R}$ (or $\tilde{R}'i, j$ in $\tilde{R}'$) indicates the probability that link $I_j$ exists on the path connecting the i-th node pair in S (or T/S). By such routing matrix relaxation, a neural-network based network tomography framework can be implemented as shown in FIG. 2.

Figure 2:
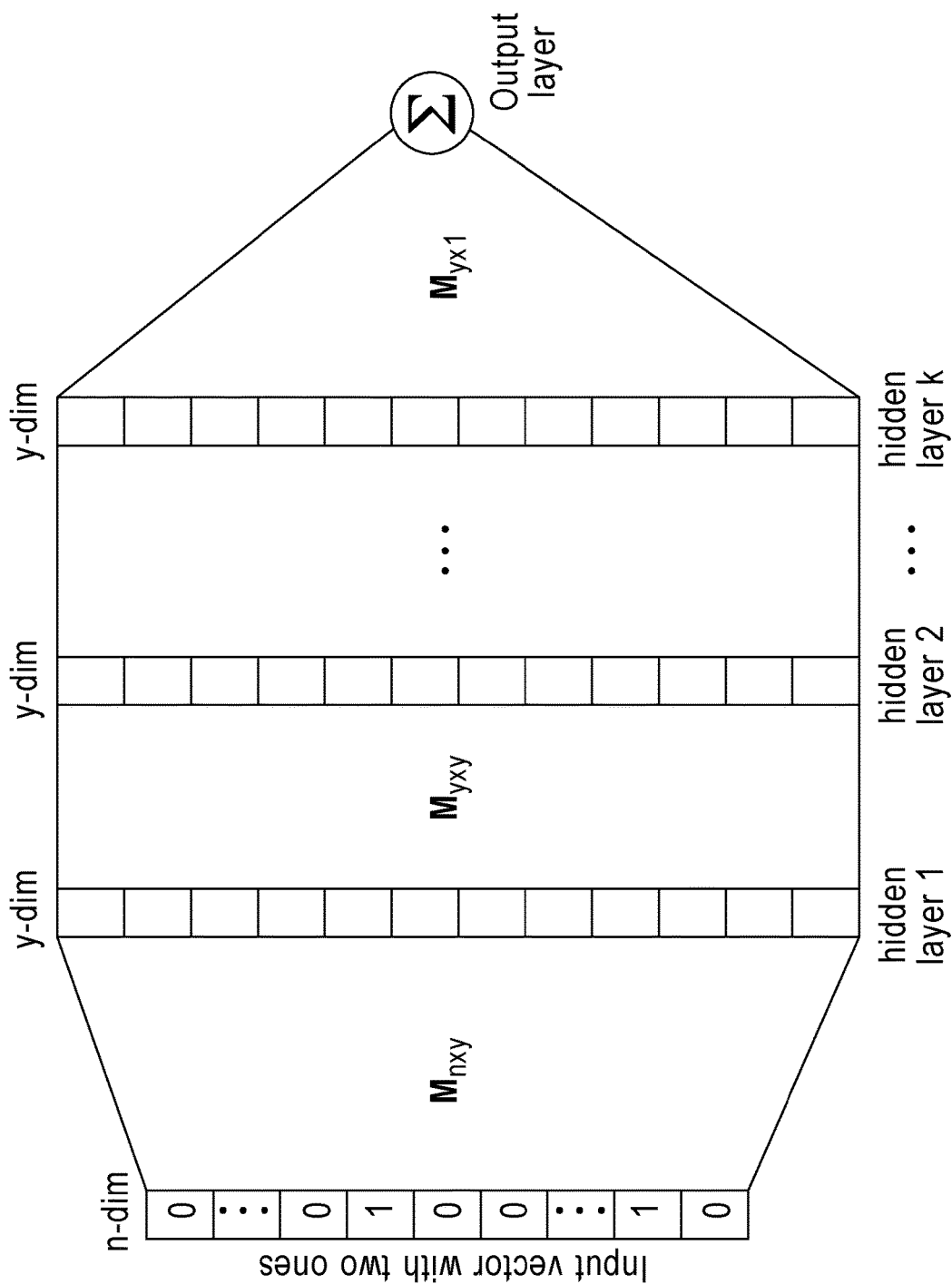
FIG. 2 illustrates a neural network that may be used in the method.

FIG. 2 illustrates a neural network model consisting of k fully connected hidden layers, where each hidden layer contains γ neurons. Here, γ is the estimated number of links in the network. In an exemplary embodiment, γ is assumed to be twice or three times the total number of available nodes or somewhere between twice to three times the total number of available nodes. For this model, each input is a node pair from set S. At the input layer, the node pair, say $v_1$ and $v_2$, is mapped to an n-dimensional "two-hot" vector $v_0$ (recall that n is the total number of nodes), where only positions corresponding to $v_1$ and $v_2$ are 1 and 0 elsewhere. Next, $V_0^T$ is multiplied by an n×γ matrix $M_1$ and then added to a bias vector $b_1$. The resulting $V_0^T M_1 + b_1^T$ is passed to hidden layer 1 and taken as input by an activation function σ, i.e., hidden layer 1 outputs $\sigma(V_0^T M_1 + b_1^T)$. Each of the hidden layers has the same activation function a and operates the same way. When the output vector from hidden layer j−1 is $v_{j-1}$; then the output from hidden layer j (j≤k) is $V_j^T = \sigma(V_{j-1}^T M_j + b_j^T)$, where Mj is a γ×γ weight matrix between hidden layers j−1 and j, and $b_j$ is the corresponding bias vector. Finally, $V_k^T$ generated by hidden layer k is multiplied by a γ×1 weight vector m, i.e., $V_k^T$, as the final path performance metric between the input node pair $v_1$ and $v_2$ at the output layer (only one neuron and no activation function or bias in the final output layer).

In an embodiment, sigmoid is selected as the activation function σ across all hidden layers, i.e., the sum of all output values at each hidden layer is always 1. When performance metrics are additive, for the input node pair, say the i-th node pair in set S, intuitively, the purpose of all hidden layers is to compute the i-th row $\tilde{R}i$, of the stochastic routing matrix $\tilde{R}$. Thus, the output of the k-th hidden layer represents $\tilde{R}i$ with respect to the i-th node pair in S. Then the weight vector m connecting to the output layer represents the approximated metrics for all links in the network, i.e., m approximates w in equation (1). Therefore, FIG. 2 is graphic abstraction of equation (1) in terms of neural networks. Moreover, the mapping from node pairs to the routing matrix is highly complicated and likely to be non-linear. Therefore, multiple (k) hidden layers are used to capture such relations, where each additional layer tries to refine the probability of each link appearing on a particular path.

When performance metrics are non-additive, e.g., congestion level and bandwidth, the design intuition is that the weight vector m in FIG. 2 still acts as an estimator of vector w. However, in this case, ⊗ in equation (1) is no longer a linear operator. Specifically, for the i-th input node pair, the goal of the k-th hidden layer is to output a "one-hot" vector $v_k$ with 1 in only one position and 0 elsewhere. In this "one-hot" vector, the position with value 1 corresponds the most problematic link for the congestion level and bandwidth tomography, and thus the final output $V_k^T$ m remains valid. On the other hand, since the objective is to accurately predict the product of $V_k^T$ and m and $v_k$ and m are not unique for the same product, e.g., $v_k$ may not be a "one-hot" vector, one only needs to train the neural network model for such product instead of individual $v_k$ and m, thus easing the training process.

The above-described framework (NeuTomography) purely utilizes the given measurements of node pairs in S to predict the path performance of node pairs in T\S. However, the measured performance metric distribution might be different from the actual performance metric distribution as S can be any subset of T, thus potentially causing model overfitting. As such, a revised embodiment (Path Augmented Tomography) is proposed that leverages S to construct additional input data to improve the prediction accuracy.

In the revised embodiment, each node pair $\phi \in S$, let $d_\phi$ denote the measured path performance metric with respect to $\phi$, and V(S) the set of nodes appearing in the node pairs of set S. Then, the measurement data can be directly mapped to a weighted graph $G'=(V(S), S, \{d_\phi\}_{\phi \in S}$, where V(S) is the set of vertices, S specifies the end-points of all edges in G', and $\{d_\phi\}_{\phi \in S}$ (i.e., path performance metrics with respect to S in the input data) are the corresponding edge weights in G'. In G', for each node pair μ in T\S, there exists a path Pμ connecting the nodes in μ if G' is a connected graph. The performance metric of Pμ, denoted by $\tilde{d}\mu$ is used as the estimation of the real path metric of the unmeasured node pair μ, and (μ, $\tilde{d}\mu$) is fed to the prior described framework (NeuTomgraphy) as additional data. Then $\tilde{d}\mu$ is updated iteratively using its initial estimation and the predicted value generated by the prior described framework. Lastly, the refined $\tilde{d}\mu$ is returned as the final inferred path performance metric for $\mu \in T\setminus S$.

FIG. 3 illustrates an algorithm for implementing the Path Augmented Tomography (PAT). In the algorithm, the path performance estimation $\tilde{d}\mu$ is first computed for each node pair μ in T\S by lines 1-3. Such performance estimation depends on the performance metric of interest in the given tomography task. In particular, when link metrics are additive, $\tilde{d}\mu$ corresponds to the path with the smallest end-to-end accumulated performance metric in the weighted graph G'. When the path performance metric corresponds to the most problematic link on this path, $\tilde{d}\mu$ is estimated according to the healthiest path in G'. Next, with this path performance estimation, the neural network framework is iteratively trained. Specifically, from the |T\S| unmeasured node pairs, α|T\S| random node pairs with the estimated path performance values are selected (by line5) and combined with the given measurement data (line 6) as the augmented training data to train the NeuTomography framework (line 7). After this training process, the path performance estimation ($\tilde{d}\mu$) $\mu \in T\setminus S$ is updated by lines 8-10. In particular, parameter β (0≤β<1) is employed in line 9 to balance the estimated and the predicted value so as to avoid overfitting. Such training and value updating process is repeated until the maximum number of iterations is reached. Finally, the algorithm outputs ($\tilde{d}\mu)\mu \in T\setminus S$.

There are two key operations in the Algorithm of FIG. 3, i.e., line 2 for path performance estimation before training and line 9 for path performance update after training. Regarding line 2, if the underlying routing principle aligns with the performance metric of interest, e.g., routing policy finds the path with the minimum delay when delay is the performance metric, then the estimated value provides a performance bound. Such bound is iteratively adjusted by line 9, and the objective is to use the bound to finally approximate the real value. While for other routing principles, the routing objective may deviate from the performance metric of interest. Therefore, the estimated performance metric in line 2 is only loosely correlated to the real value.

Given that only the path measurements for set S are available, among all the performance metrics of interest, the minimum number of hops between two nodes provides the most useful information on the underlying network topology. This is because, for other path performance metrics, e.g., delay and congestion level, even if two nodes are neighbors, their link performance metric can be arbitrarily larger or smaller than their path performance metric.

Figure 4A:
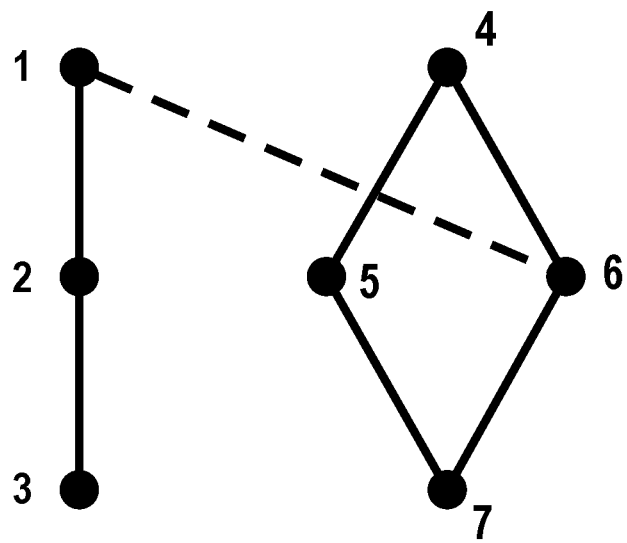
FIG. 4A and FIG. 4B illustrate exemplary network topologies that may be generated when applying exemplary embodiments of the inventive concept.
Figure 4B:
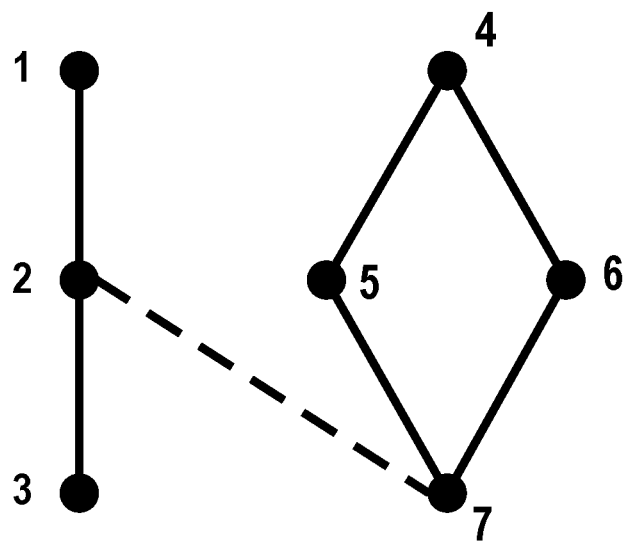

Even though the path measurements with respect to set S are the number of hops, the corresponding network topology is not unique. For instance, in FIG. 4A and FIG. 4B, given the same measurements, both topologies suffice and exist with equal probabilities. Thus, the following definition is introduced to extend the description of network topologies. For network G, $A^{(m)}$ (m is an integer) is the m-extended adjacency matrix of G, where $A_{i,j}^{(m)}=1$ if nodes i and j are m-hop away in G and $A_{i,j}^{(m)}=0$ otherwise. Therefore, when m=1, the extended adjacency matrix is reduced to a regular adjacency matrix. Comparing $A^{(m)}$ (m>1) to $A^{(1)}$, $A^{(m)}$ establishes a coarse-grained representation of the network topology. Specifically, since $A^{(1)}$ is generally not unique (see FIGS. 4A and 4B), if $A^{(m)}$ is accurate when m is small, then the collection of the constructed extended adjacency matrices $\{A^{(1)}, A^{(2)}, \ldots, A^{(m)}\}$ jointly determine the network topology with various granularity and accuracy tradeoffs, through which the network operator scan perform network planning tasks based on the optimization objectives and the topology granularity/accuracy preference levels. Thus, with this definition, one can construct the m-extended adjacency matrix for different m. The reconstruction rule is: for each node pair $\{i,j\} \in T$, if the (inferred or given) performance metric of path between i and j falls into the region of (m−0.5,m+0.5], then $A^{(m)}$ i,j=1; otherwise, $A^{(m)}$ i,j=0.

In an exemplary embodiment, the neural network shown in FIG. 2 can be operated on a new node pair (other than set S) to determine a performance path metric (e.g., delay, congestion level, etc.) associated with the new node pair. As discussed above, the neural network was previously trained using some of the node pairs (set S) for which this performance path metric information was known. In an exemplary embodiment, each neuron of a layer of the neural network corresponds to one of the available node pairs and computes a probability indicating whether the link of the corresponding neuron is present in a path between nodes of the new node pair. For example, with reference to FIG. 1 and FIG. 2, the neurons associated with the links between nodes 6 and 7, nodes 5 and 6, and nodes 7 and 4 could indicate there is a high probability that their links are present when a new node pair of nodes 5 and 4 is applied to the neural network because links between nodes 6 and 7, nodes 5 and 6, and nodes 7 and 4 are ultimately present in the path between nodes 5 and 4. Since the link between nodes 1 and 2 are not ultimately present in the path between nodes 5 and 4, the neuron associated with nodes 1 and 2 would provide a low probability.

In an exemplary embodiment, the training step S103 of FIG. 1 is modified to use both the obtained path measurements and additional path performance metrics to train the machine learning model. For example, the additional path performance metrics are derived from the obtained path measurements. For example, with reference to FIG. 1, if a first additive path performance metric between nodes 5 and 7 is known and a second additive path performance metric between nodes 7 and 4 is known, it can be assumed that the additive path performance metric between nodes 5 and 4 is the sum of the first and second metrics or the sum multiplied by some predefined weight.

Figure 5:
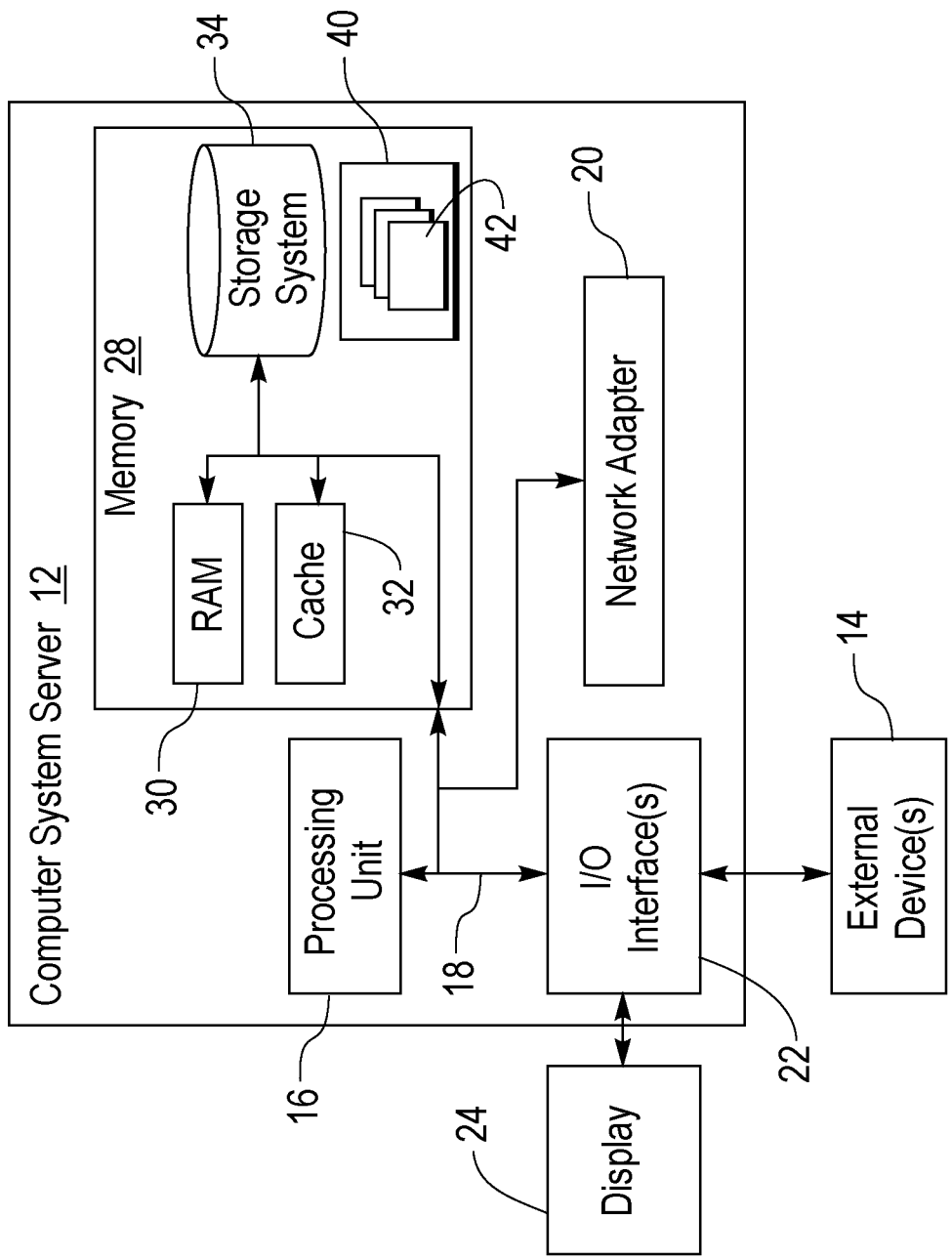
FIG. 5 shows an exemplary computer system that may be used to operate embodiments of the inventive concept.

FIG. 5 shows an exemplary computer system that may be used to operate the predictor 100. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40 (e.g., predictor 100), having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, each of the program modules 42 could implement one or more of steps S101-S104 of FIG. 1.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A computer-implemented method for automatically predicting a topology of a network comprising a plurality of nodes, the method comprising:
    selecting, by a processor, a path performance metric among a plurality of available metrics;
    obtaining, by the processor, a value of the selected path performance metric only for each node pair within a selected subset of node pairs among the plurality of nodes;
    using, by the processor, the obtained values of the selected path performance metric to train a machine-learning model to predict a value of the selected path performance metric for all node pairs of the plurality of nodes outside the selected subset; and
    using, by the processor, the obtained values and the predicted values of the selected path performance metric to construct a topology of the network,
    wherein the path performance metric of a given node pair of the selected subset is based on a communication exchanged between nodes of the given node pair, and
    wherein node pairs of the selected subset number less than node pairs of the nodes outside the subset,
    wherein the machine-learning model is a neural network including a plurality of layers, where each layer includes a plurality of neurons corresponding to an estimated number of links within the network, and
    wherein each neuron is associated with a corresponding one of the node pairs of the selected subset, and when the neural network is operated on input data indicating a given node pair of the node pairs outside the selected subset, a given neuron among the neurons indicates a probability that a link associated with the given neuron is present within a path between nodes of the given node pair.

2. The computer-implemented method of claim 1, wherein the estimated number of links is twice the number of nodes within the plurality.

3. The computer-implemented method of claim 1, wherein the selected path performance metric indicates a delay between two nodes of a node pair of the nodes outside the selected subset.

4. The computer-implemented method of claim 1, wherein the selected path performance metric indicates a congestion level associated with a link between two nodes of a node pair of the nodes outside the selected subset.

5. The computer-implemented method of claim 1, wherein the processor obtains the values of the selected path performance metric by executing an operating system command to send a message to each node of the node pairs of the selected subset.

6. The computer-implemented method of claim 1, wherein the machine-learning model is trained using the obtained values of the selected path performance metric and at least one additional path performance metric derived from the obtained values of the selected path performance metric.

7. The computer-implemented method of claim 1, wherein the topology is constructed by comparing each of the obtained and predicted values of the selected path performance metric with a predefined range.

8. The computer-implemented method of claim 7, wherein the topology includes a link between a node pair associated with a given value among the obtained and predicted values of the selected performance metric when the given value is within the predefined range and excludes the link when the given value is outside the predefined range.

9. A system for automatically predicting a topology of a network comprising a plurality of nodes, the system comprising:
a memory storing a computer program; and
a processor configured to execute the computer program, wherein the computer program selects a path performance metric among a plurality of available metrics,
obtains a value of the selected path performance metric only for each node pair within a selected subset of node pairs among the plurality of nodes,
uses the obtained values of the selected path performance metric to train a machine-learning model to predict a value of the selected path performance metric for all node pairs of the plurality of nodes outside the selected subset, and
uses the obtained and predicted values of the selected path performance metric to construct a topology of the network,
wherein the path performance metric of a given node pair of the selected subset is based on a communication exchanged between nodes of the given node pair, and
wherein node pairs of the selected subset number less than node pairs of the nodes outside the subset,
wherein the machine-learning model is a neural network including a plurality of layers, where each layer includes a plurality of neurons corresponding to an estimated number of links within the network,
wherein each neuron is associated with a corresponding one of the node pairs of the selected subset, and when the neural network is operated on input data indicating a given node pair of the node pairs outside the selected subset, a given neuron among the neurons indicates a probability that a link associated with the given neuron is present within a path between nodes of the given node pair.

10. The system of claim 9, wherein the machine-learning model is trained using the obtained values of the selected path performance metric and at least one additional path performance metric derived from the obtained values of the selected path performance metric.

11. The system of claim 9, wherein the topology is constructed by comparing each of the obtained and predicted values of the selected path performance metric with a predefined range.

12. The system of claim 11, wherein the topology includes a link between a node pair associated with a given value among the obtained and predicted values of the selected performance metric when the given value is within the predefined range and excludes the link when the given value is outside the predefined range.

13. A computer program product for automatically predicting a topology of a network comprising a plurality of nodes, the computer program product comprising a non-transitory computer readable storage medium having program code embodied therewith, the program code executable by a processor, to perform method steps comprising instructions for:
selecting a path performance metric among a plurality of available metrics;
obtaining a value of the selected path performance metric only for each node pair within a selected subset of node pairs among the plurality of nodes;
using the obtained values of the selected path performance metric to train a machine-learning model to predict a value of the selected path performance metric for all node pairs of the plurality of nodes outside the selected subset; and
using the obtained and predicted values of the selected path performance metric to construct a topology of the network, and
wherein the path performance metric of a given node pair of the selected subset is based on a communication exchanged between nodes of the given node pair, and
wherein node pairs of the selected subset number less than node pairs of the nodes outside the subset,
wherein the machine-learning model is a neural network including a plurality of layers, where each layer includes a plurality of neurons corresponding to an estimated number of links within the network, and
wherein each neuron is associated with a corresponding one of the node pairs of the selected subset, and when the neural network is operated on input data indicating a given node pair of the node pairs outside the selected subset, a given neuron among the neurons indicates a probability that a link associated with the given neuron is present within a path between nodes of the given node pair.

* * * * *

UNITED STATES PATENT AND TRADEMARK OFFICE
CERTIFICATE OF CORRECTION

| | | |
|---|---|---|
| PATENT NO. | : 11,032,150 B2 | Page 1 of 1 |
| APPLICATION NO. | : 16/443121 | |
| DATED | : June 8, 2021 | |
| INVENTOR(S) | : Liang Ma and Mudhakar Srivatsa | |

It is certified that error appears in the above-identified patent and that said Letters Patent is hereby corrected as shown below:

In the Specification

Column 1 Line 8 delete:

"AUTOMATIC PREDICTION OF BEHAVIOR AND TOPOLOGY OF A NETWORK USING LIMITED INFORMATION

BACKGROUND"

And insert:

--AUTOMATIC PREDICTION OF BEHAVIOR AND TOPOLOGY OF A NETWORK USING LIMITED INFORMATION

GOVERNMENT LICENSE RIGHTS

This invention was made with government support under W911NF1630001 awarded by Army Research Office (ARO). The government has certain rights to this invention.

BACKGROUND--

Signed and Sealed this
Twenty-fifth Day of April, 2023

Katherine Kelly Vidal
*Director of the United States Patent and Trademark Office*